Sept. 7, 1954  R. R. GUNDERSON  2,688,335
BOOSTER VALVE UNIT FOR BRAKES
Filed March 17, 1950

Inventor:
Ralph R. Gunderson
By:
Schroeder, Merriam, Hofgren & Brady
Attorneys

Patented Sept. 7, 1954

2,688,335

UNITED STATES PATENT OFFICE 2,688,335

BOOSTER VALVE UNIT FOR BRAKES

Ralph R. Gunderson, Chicago, Ill.

Application March 17, 1950, Serial No. 150,308

5 Claims. (Cl. 137—102)

This invention relates to fluid pressure brake systems, and more particularly to an improved booster valve unit which will permit the slack to be taken up in the brake system by low pressure fluid from the master cylinder, and then automatically admit fluid from a high-pressure auxiliary system under control of the master cylinder.

The unit is adapted for use on brakes of airplanes, trucks, automobiles, and the like.

The primary object of the invention is to provide a simplified unit in which the brake fluid required to take up the slack in the system may be supplied at low pressure by the master cylinder, and only a small volume of fluid from the high pressure system is required to supply the final stopping power. This enables a small size pump to furnish the required high-pressure fluid.

The present invention is an improvement on the unit shown in my Patent No. 2,476,089, issued July 12, 1949. In the present unit, the movable parts are arranged to be moved back and forth in the same direction, and the device is easier to construct and may be accurately adjusted.

The invention is illustrated in a preferred embodiment in the accompanying drawings, in which—

Figure 1:
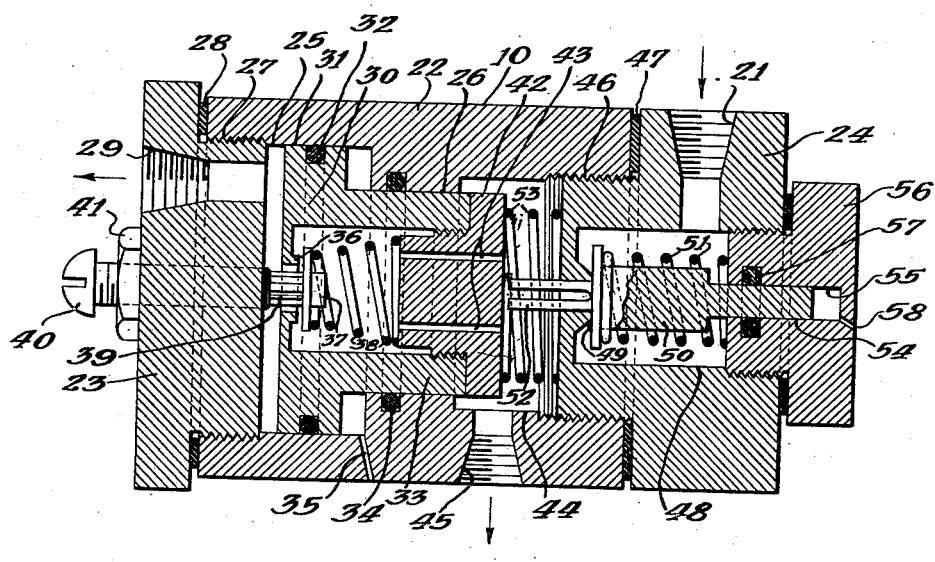
Figure 2:
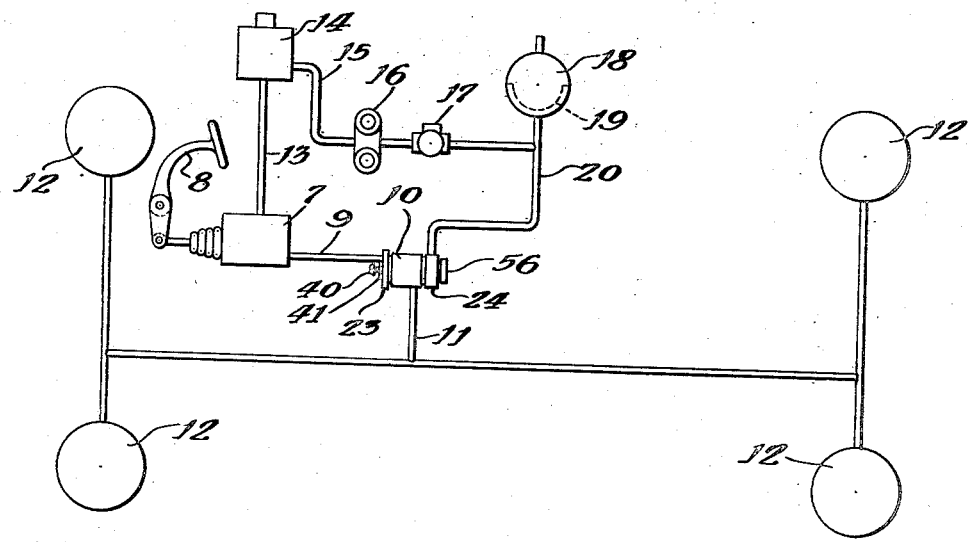

Figure 1 is a longitudinal sectional view of the booster valve unit; and Fig. 2, a diagrammatic view of the brake system in which the improved unit may be used.

In the system illustrated in Fig. 2, a master cylinder unit 7 is provided with a foot pedal 8 for displacing brake fluid at low pressure through a conduit 9 to a booster valve unit 10, which is the subject of the present invention. A conduit 11 leads from the booster valve unit to the wheel cylinder brake 12. Brake fluid, either liquid or gas, when the brakes are released, will travel back through the master cylinder and conduit 13 to a reservoir 14 which may be vented to atmosphere if liquid is used. Fluid is pumped from the reservoir through a conduit 15, by means of a high-pressure pump 16 through a check valve 17 to an accumulator 18, which may be provided with a flexible diaphragm 19. The accumulator supplies high-pressure brake fluid to a conduit 20 through a port 21 in the booster valve unit 10.

The booster valve unit 10 comprises a housing 22 provided with a low-pressure head 23 and a high-pressure head 24. The housing has, at the low pressure end, a cylinder 25 and an axially disposed communicating cylinder 26 of smaller diameter. Preferably, the head 23 makes a threaded connection at the end of the cylinder 25, as indicated at 27, and a gasket 28 insures a fluid tight fit. A port 29 is provided for connection to the conduit 9.

A compound piston 30 has a head 31 fitting in the cylinder 25, and is shown with an O-ring 32 to make a fluid tight connection. The piston has a smaller head 33 to fit the cylinder 26 which is shown with an O-ring 34, to maintain a fluid-tight sliding connection. The rear portion of the cylinder 25 may be vented to atmosphere, as shown at 35.

The compound piston 30 is hollow, and is provided at its low-pressure end with a seat 36 for a check valve 37 which is urged to closed position by means of a compression spring 38. Preferably, the check valve has an outwardly extending stem 39 to abut against an adjusting screw 40 which is threaded through the head 33 and held by a lock nut 41. Thus, when the piston is in the position shown in Fig. 1, the check valve is held open. The high-pressure end of the piston has a threaded head 42 provided with fluid openings 43. The head may be removed to install the check-valve 37 and its spring 38. The cylinder 26 communicates with an enlarged chamber 44 which has a side port 45 to which the conduit 11 may be attached.

The high-pressure head 24 is shown with a threaded connection at 46 to the main housing, and a gasket 47 is provided to insure a fluid tight connection. The head 24 is hollow and is shown with a valve chamber 48 provided with a seat 49 for a valve member 50 which is urged into closed position by means of a compression spring 51. One end of the valve member is provided with a hollow shank 52, so that when the valve member is pressed away from its seat 49 by pressure of the piston 30, high pressure fluid will be admitted by the opening 21 to the chamber 44. A compression spring 53 is shown in the chamber 44 urging the piston 30 away from the high pressure head 24. It will be understood that, if the unit is mounted vertically, the spring 53 would be omitted, and that its function might be performed by gravity or other pressure means.

The outer end of the valve member 50 has a shank 54 slidably mounted in a cylinder 55 provided with a threaded plug 56. An O-ring 57 is shown to maintain a fluid tight connection, and a vent 58 is provided for the cylinder 55. As the shank 54 has the same area as the opening in the valve seat 49, the piston 30 will not have to overcome the pressure of the fluid in the chamber 48 in opening the valve. Preferably a check-valve (not shown) is provided in the conduit 20 adjacent to the opening 21, so that no liquid can escape from the high pressure end of the unit, even though the high pressure source should fail. Under those conditions, the brakes could still be applied by the master cylinder without any aid from the high pressure head.

*Operation*

When it is desired to apply the brakes, pressure is exerted on the pedal 8, so as to displace fluid from the master cylinder through the conduit 9 and the piston 30 to the wheel cylinders 12. As pressure builds up in the system, the piston 30 will begin to move towards the high pressure end, because the area of the head 31 is larger than the area of the head 26. With this movement the valve 37 will be closed by the spring 38, and when the piston has traveled a short distance, depending on the adjustment of the screw 40, it will engage the shank 52 to open the valve 50 and admit high pressure brake fluid to the wheel cylinders. As the pressure increases, the piston 30 will be forced back towards the master cylinder side and the admission of high pressure fluid is controlled in a direct ratio to the low pressure force applied to the pedal 8. Thus, it will be understood that the application of the brakes is fully controlled by the pedal at all times.

When the pedal pressure is relaxed, the piston moves back to the low pressure end and the valve 37 is opened, so that the excess fluid, which was admitted through the high pressure side, travels back through the master cylinder to the reservoir 14.

The foregoing detailed description is given for clearness of understanding only, and no unnecessary limitations should be understood therefrom, for some modifications will be obvious to those skilled in the art.

I claim:

1. A booster valve unit for a fluid pressure brake system, comprising: a housing providing a low-pressure head structure for a control cylinder of one diameter, adapted to be connected at one end to a master-cylinder, and an axially disposed communicating cylinder of smaller diameter communicating with an opening adapted to be connected to wheel cylinders; a compound piston making fluid tight sliding connections with said control cylinder and said communicating smaller cylinder, said low-pressure cylinder having a vent to the side of the piston away from the low-pressure head; a check-valve in said compound piston controlling communication therethrough, said check-valve having a portion which will engage said low-pressure head and open communication through the piston when said piston is moved a predetermined distance towards said head; pressure means urging the piston toward the head to open the check-valve; and a high-pressure head including a valve having a movable member controlling communication from a source of high-pressure fluid to said opening to the wheel cylinders, and said valve member having a portion which will be engaged by the piston to open communication with the source of high-pressure fluid when said piston is moved a predetermined distance towards said high-pressure head.

2. A booster valve unit for a fluid pressure system, comprising: a housing having a high pressure chamber with a head structure and an axially disposed low pressure chamber with a head; an opening in the low-pressure cylinder for connection to a master-cylinder; a pressure-movable member having a large head of one area in said low pressure chamber and a second head of smaller area in said high pressure chamber; a vent in the housing between the heads of the pressure-movable member; an operating opening to the high-pressure chamber, a valve seat in an opening through said pressure-movable member; a valve-member fitting said seat and having a portion which will engage the low-pressure head to open communication through the seat when the pressure-movable member moves a predetermined distance towards the head of the low-pressure chamber; pressure-means urging said movable member towards said low-pressure head; said head for said high-pressure chamber having a valve seat in an opening to a source of high-pressure fluid; and another valve-member fitting said last mentioned seat to control communication from said high-pressure course to said high-pressure chamber, said last mentioned valve-member having a portion which will be engaged by the pressure-movable member and open communication between the high-pressure source and the high-pressure chamber when the pressure-movable member is moved a predetermined distance away from the low-pressure head.

3. A device as specified in claim 1, in which the high-pressure head is hollow to form a chamber for the valve, the slidable valve member has a shank, opposite its seating portion, which makes a liquid tight connection with said head.

4. A device as specified in claim 1, in which the valve member is positioned to move axially with respect to the control cylinder and piston.

5. A device as specified in claim 2, in which the pressure movable-member is a compound piston with one of its two heads making a sliding fluid tight connection with the high pressure chamber and the other head with the low pressure chamber.

References Cited in the file of this patent

UNITED STATES PATENTS

| Number | Name | Date |
|---|---|---|
| 2,476,089 | Gunderson | July 12, 1949 |
| 2,476,378 | Majneri | July 19, 1949 |
| 2,501,941 | Hollerith | Mar. 28, 1950 |